(12) United States Patent
Hofer et al.

(10) Patent No.: US 11,848,704 B2
(45) Date of Patent: Dec. 19, 2023

(54) SYSTEM AND METHOD FOR COMMUNICATION BETWEEN MODULES OF A BATTERY SYSTEM

(71) Applicant: Samsung SDI Co., Ltd., Yongin-si (KR)

(72) Inventors: Maximilian Hofer, Hartberg (AT); Roland Klobasa, Graz (AT); Gernot Kraberger, Graz (AT)

(73) Assignee: Samsung SDI Co., Ltd., Yongin-si (KR)

( * ) Notice: Subject to any disclaimer, the term of this patent is extended or adjusted under 35 U.S.C. 154(b) by 260 days.

(21) Appl. No.: 17/228,142

(22) Filed: Apr. 12, 2021

(65) Prior Publication Data

US 2021/0328675 A1 Oct. 21, 2021

(30) Foreign Application Priority Data

Apr. 15, 2020 (EP) .................................... 20169595
Apr. 6, 2021 (KR) ........................ 10-2021-0044761

(51) Int. Cl.
*H04B 10/275* (2013.01)
*H04B 10/114* (2013.01)
(Continued)

(52) U.S. Cl.
CPC ........ *H04B 10/275* (2013.01); *H01M 10/425* (2013.01); *H01M 10/482* (2013.01);
(Continued)

(58) Field of Classification Search
CPC ............. H04B 10/275; H04B 10/1143; H01M 10/425; H01M 10/482; H01M 2010/4278; H02J 7/004
See application file for complete search history.

(56) References Cited

U.S. PATENT DOCUMENTS

2003/0072053 A1* 4/2003 Weaver ............... H04J 14/0227
398/79
2005/0018859 A1* 1/2005 Buchholz ............. H04R 1/1016
381/74
(Continued)

FOREIGN PATENT DOCUMENTS

DE 10 2012 202 690 A1 8/2013
DE 20 2016 007 525 U1 5/2017
(Continued)

OTHER PUBLICATIONS

Extended European Search Report for corresponding European PatentApplication No. 201695954, dated Oct. 8, 2020, 6pp.

*Primary Examiner* — Sarah A. Slifka
(74) *Attorney, Agent, or Firm* — Lewis Roca Rothgerber Christie LLP

(57) ABSTRACT

A battery system includes: a plurality of battery modules including a plurality of battery cells, wherein each battery module comprises a battery module monitor configured to monitor a state of the battery cells; a battery system monitor; and an optical communication system configured to connect the battery module monitors with the battery system monitor over at least two communication paths, wherein the optical communication system is configured to use at least two different wavelengths of light to differentiate between the communication paths.

15 Claims, 8 Drawing Sheets

(51) Int. Cl.
    *H01M 10/42*     (2006.01)
    *H01M 10/48*     (2006.01)
    *H02J 7/00*     (2006.01)

(52) U.S. Cl.
    CPC . *H04B 10/1143* (2013.01); *H01M 2010/4278* (2013.01); *H02J 7/0047* (2013.01)

(56) References Cited

U.S. PATENT DOCUMENTS

| | | | |
|---|---|---|---|
| 2008/0298811 A1* | 12/2008 | Son | H04B 10/1149 398/172 |
| 2013/0202292 A1 | 8/2013 | Sokolov et al. | |
| 2013/0314094 A1* | 11/2013 | Farmer | H01M 10/482 324/426 |
| 2019/0260097 A1* | 8/2019 | Kwon | H01M 10/482 |
| 2020/0059106 A1* | 2/2020 | Karlsson | H01M 10/425 |

FOREIGN PATENT DOCUMENTS

| | | |
|---|---|---|
| DE | 10 2017 204 138 A1 | 9/2018 |
| EP | 2 296 214 A1 | 3/2011 |
| WO | WO 2011/091234 A1 | 7/2011 |
| WO | WO 2019/122064 A1 | 6/2019 |

\* cited by examiner

SYSTEM AND METHOD FOR COMMUNICATION BETWEEN MODULES OF A BATTERY SYSTEM

CROSS-REFERENCE TO RELATED APPLICATION

The present application claims priority to and the benefit of European Patent Application No. 20169595.4, filed in the European Patent Office on Apr. 15, 2020, and Korean Patent Application No. 10-2021-0044761, filed in the Korean Intellectual Patent Office on Apr. 6, 2021, the entire contents of both of which are incorporated herein by reference.

BACKGROUND

1. Field

Aspects of some example embodiments of the present invention relate to a system and method for communication between components of a battery system, such as, for example, between battery (sub)modules.

2. Background

In the recent years, vehicles for transportation of goods and people have been developed using electric power as a source for motion. Such an electric vehicle is an automobile that is propelled by an electric motor, using energy stored in rechargeable batteries. An electric vehicle may be solely powered by batteries or may be a form of hybrid vehicle powered by for example a gasoline generator.

Furthermore, the vehicle may include a combination of electric motor and conventional combustion engine. In general, an electric-vehicle battery (EVB) or traction battery is a battery used to power the propulsion of battery electric vehicles (BEVs). Electric-vehicle batteries differ from starting, lighting, and ignition batteries because they are designed to give power over sustained periods of time. A rechargeable or secondary battery differs from a primary battery in that it can be repeatedly charged and discharged, while the latter provides only an irreversible conversion of chemical to electrical energy.

The above information disclosed in this BACKGROUND section is only for enhancement of understanding of the background and therefore the information discussed in this BACKGROUND section does not necessarily constitute prior art.

SUMMARY

Aspects of some example embodiments of the present invention relate to a system and method for communication between components of a battery system, such as, for example, between battery (sub)modules. Such components of a modern battery system may be a battery module monitor BMM and/or a battery system monitor BSM and/or a battery disconnecting unit BDU or the like.

According to some example embodiments, a battery system includes: a plurality of battery modules including a plurality of battery cells, wherein each battery module comprises a battery module monitor configured to monitor a state of the battery cells; a battery system monitor; and an optical communication system configured to connect the battery module monitors with the battery system monitor over at least two communication paths, wherein the optical communication system is configured to use at least two different wavelengths of light to differentiate between the communication paths.

According to some example embodiments, the optical communication system is a free-space optical communication system.

According to some example embodiments, the optical communication system is configured to use a first wavelength for a communication path in a first direction and a second wavelength, different from the first wavelength, for a communication path in a second direction.

According to some example embodiments, the optical communication system is configured to use different wavelengths for communication between the battery system monitor and different ones of the battery module monitors.

According to some example embodiments, each of the battery module monitors comprises a discrete circuit configured to provide an output based on which a battery module monitor individual identifier is derived.

According to some example embodiments, each of the battery modules comprises an identical battery module monitor with an individual resistive print thereon as the discrete circuit.

According to some example embodiments, each battery module monitor is configured to derive an individual identifier based on a signal strength received by the respective battery module monitor and to use the individual identifier for communication with the battery system monitor.

According to some example embodiments, each of the battery module monitors comprises an optical transmitter and an optical receiver.

According to some example embodiments, the battery system monitor comprises at least one optical transmitter and at least one optical receiver.

According to some example embodiments, at least one optical transmitter is a light-emitting diode.

According to some example embodiments, at least one optical receiver is a photodiode or phototransistor.

According to some example embodiments, the battery system further includes: a plurality of optical transmitters, wherein each optical transmitter is configured to emit a distinct wavelength of light; and a plurality of light filters configured to filter distinct wavelengths of light generated by at least one optical transmitter.

According to some example embodiments, the plurality of battery modules are connected to the battery system monitor in a daisy-chain; wherein the battery system monitor is a first component of the daisy-chain; wherein each battery module monitor comprises: a first optical communication system transmitter-receiver pair configured to communicate with a preceding component of the daisy-chain; and a second optical communication system transmitter-receiver pair configured to communicate with a following component of the daisy-chain.

According to some example embodiments, the battery system further includes a light barrier between the first optical communication system transmitter-receiver pair and the second optical communication system transmitter-receiver pair.

According to some example embodiments, the battery system monitor comprises: a first battery system monitor optical communication system transmitter-receiver pair configured to communicate with a first battery module monitor of the daisy-chain; and a second battery system monitor optical communication system transmitter-receiver pair configured to communicate with a last battery module monitor of the daisy-chain thereby forming a communication ring.

BRIEF DESCRIPTION OF THE DRAWINGS

Features will become more apparent to those of ordinary skill in the art by describing in more detail aspects of some example embodiments with reference to the attached drawings in which.

DETAILED DESCRIPTION

Figure 1:
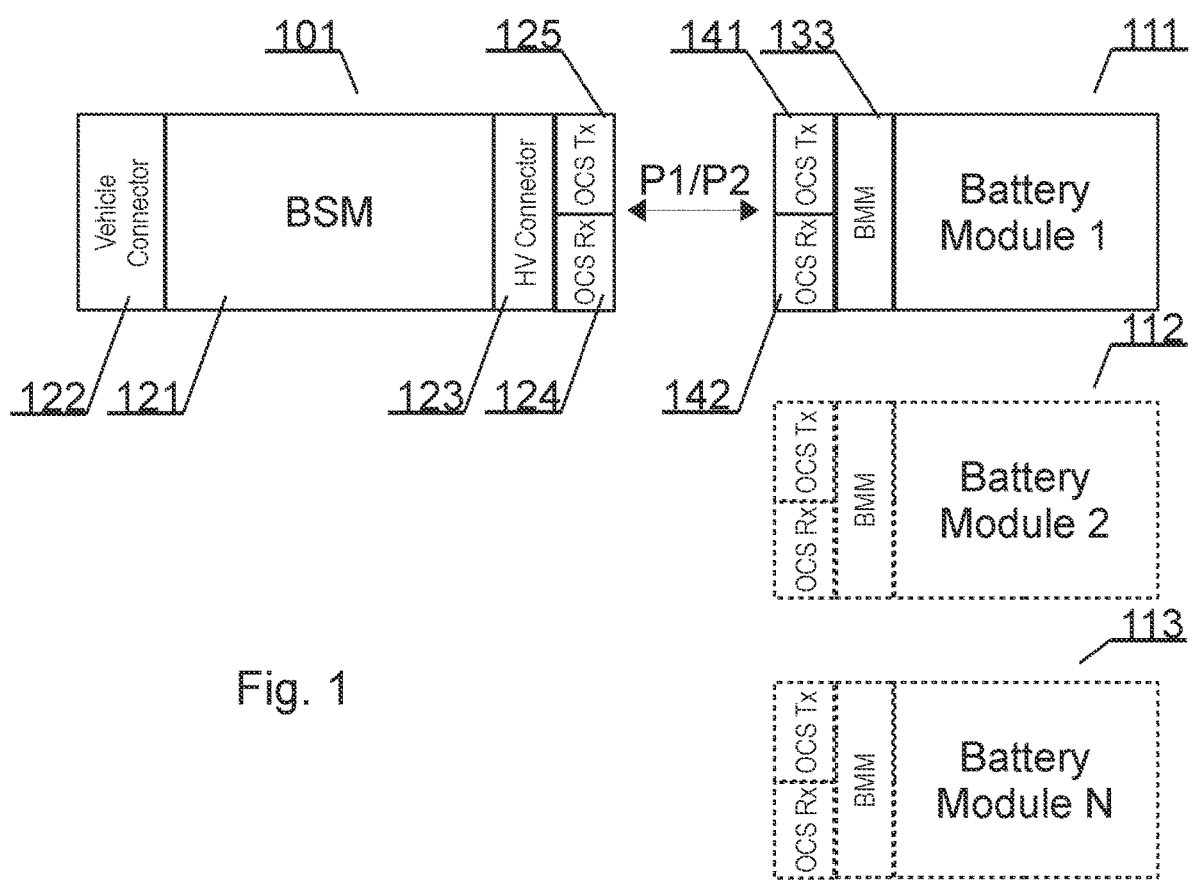
FIG. 1 is a block diagram illustrating some components of the system according to some example embodiments.

Reference will now be made in detail to aspects of some example embodiments, which are illustrated in the accompanying drawings. Characteristics and features of some example embodiments, and implementation methods thereof will be described in more detail with reference to the accompanying drawings. In the drawings, like reference numerals denote like elements, and redundant descriptions are omitted. As used herein, the term "and/or" includes any and all combinations of one or more of the associated listed items. Further, the use of "may" when describing embodiments of the present invention refers to "one or more embodiments of the present invention."

It will be understood that although the terms "first" and "second" are used to describe various elements, these elements should not be limited by these terms. These terms are only used to distinguish one element from another element. For example, a first element may be named a second element and, similarly, a second element may be named a first element, without departing from the scope of the present invention.

In the following description of embodiments of the present invention, the terms of a singular form may include plural forms unless the context clearly indicates otherwise.

It will be further understood that the terms "include," "comprise," "including," or "comprising" specify a property, a region, a fixed number, a step, a process, an element, a component, and a combination thereof but do not exclude other properties, regions, fixed numbers, steps, processes, elements, components, and combinations thereof.

It will also be understood that when a film, a region, or an element is referred to as being "above" or "on" another film, region, or element, it can be directly on the other film, region, or element, or intervening films, regions, or elements may also be present.

Herein, the terms "upper" and "lower" are defined according to the z-axis. For example, the upper cover is positioned at the upper part of the z-axis, whereas the lower cover is positioned at the lower part thereof. In the drawings, the sizes of elements may be exaggerated for clarity. For example, in the drawings, the size or thickness of each element may be arbitrarily shown for illustrative purposes, and thus the embodiments of the present invention should not be construed as being limited thereto.

Features of the inventive concept and methods of accomplishing the same may be understood more readily by reference to the following detailed description of embodiments and the accompanying drawings. Hereinafter, example embodiments will be described in more detail with reference to the accompanying drawings, in which like reference numbers refer to like elements throughout.

The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described.

As used herein, the term "substantially," "about," and similar terms are used as terms of approximation and not as terms of degree, and are intended to account for the inherent deviations in measured or calculated values that would be recognized by those of ordinary skill in the art. Further, if the term "substantially" is used in combination with a feature that could be expressed using a numeric value, the term "substantially" denotes a range of +/−5% of the value centered on the value.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Low-capacity rechargeable batteries are used as power supply for small electronic devices, such as cellular phones, notebook computers and camcorders, while high-capacity rechargeable batteries are used as the power supply for hybrid and fully electric vehicles and the like.

In general, rechargeable batteries include an electrode assembly including a positive electrode, a negative electrode, and a separator interposed between the positive and negative electrodes, a case for housing or enclosing the electrode assembly, and an electrode terminal electrically connected to the electrode assembly. An electrolyte solution is injected into the case in order to enable charging and discharging of the battery via an electrochemical reaction of the positive electrode, the negative electrode, and the electrolyte solution. The shape of the case, for example, cylindrical or rectangular, may depend on the battery's intended purpose. Lithium-ion (and similar lithium polymer) batteries, widely known via their use in laptops and consumer electronics, dominate the most recent group of electric vehicles in development.

Rechargeable batteries may be used as a battery module formed of a plurality of unit battery cells coupled in series and/or in parallel so as to provide a high energy density, in particular for motor driving of a hybrid vehicle. That is, the battery module may be formed by interconnecting the electrode terminals of the plurality of unit battery cells depending on a required amount of power and in order to realize a high-power rechargeable battery.

A battery system generally includes a set of any number of (potentially identical) battery modules. They may be configured in a series, parallel or a mixture of both to deliver the desired voltage, capacity, or power density. Components of battery packs include the individual battery modules and the interconnects, which provide electrical conductivity between them. The battery modules themselves may comprise a plurality of battery submodules that usually consist of a plurality of battery cells with interconnect structures.

For meeting the dynamic power demands of various electrical consumers connected to the battery system a static control of battery power output and charging is not sufficient. Thus, steady exchange of information between the battery system and the controllers of the electrical consumers is required. This information includes the battery systems actual state of charge (SoC), potential electrical performance, charging ability and internal resistance as well as actual or predicted power demands or surpluses of the consumers.

Battery systems may include a battery management system (BMS) (or otherwise a battery system monitor (BSM)) and/or battery management unit (BMU) for processing the aforementioned information. The BMS/BMU may communicate to the controllers of the various electrical consumers via a suitable communication bus, e.g. a SPI or CAN interface. The BMS/BMU may further communicate with each of the battery submodules, particularly with a cell supervision circuit (CSC) (or otherwise a battery module monitor, BMM) of each battery submodule. The CSC may be further connected to a cell connection and sensing unit (CCU) of a battery submodule that interconnects the battery cells of the battery submodule.

Thus, the BMS/BMU is provided for managing the battery pack, such as by protecting the battery from operating outside its safe operating area, monitoring its state, calculating secondary data, reporting that data, controlling its environment, authenticating it and/or balancing it.

In the context of communication, it would be beneficial to decrease cost such as, for example, costs of materials and/or assembly cost of electrical wires. At the same time it may be beneficial to address an issue of electromagnetic compatibility EMC as wire-based connections are subject to failure by electro-magnetic disturbances; furthermore they are sources for EM disturbances that have to be screened. Use of space is another concern to be taken into account when designing communication systems for battery packs as space availability for wires is limited. Further, power consumption for wire-based communication is relatively high and constitutes another problem to be addressed.

Thus, some example embodiments of the present invention may overcome or reduce at least some of the drawbacks of the prior art and to provide a system and method for communication between modules of a battery pack.

Aspects of some example embodiments of the present disclosure include a battery system comprising: a plurality of battery modules including a plurality of battery cells, wherein each battery module comprises a battery module monitor, BMM, for monitoring a state of the battery cells. The battery system further includes a battery system monitor BSM, and an optical communication system, OCS, adapted (configured) to connect the BMMs with the BSM over at least two communication paths, wherein the OCS is adapted to use at least two different wavelengths of light in order to enable a differentiation of the communication paths. In the context of the present disclosure, a battery module may be a plurality of cells supervised by one BMM and the BSM.

The battery module may but need not comprise further components. For example, such a battery module does not need to have any further structure, for example, a housing, module terminals, per-module cooling, etc. Further, the battery module of the present disclosure may also be (or include) a battery submodule. According to some example embodiments, the plurality of battery modules may have at least two battery modules. Thus, some example embodiments may remove wired connections between the battery modules in order to at least reduce issues of electromagnetic compatibility EMC caused by presence of electrical wires. A BSM (sometimes referred to as a battery management system BMS) is any electronic system that manages a battery system, such as by protecting the battery system from operating outside its safe operating ranges/states, monitoring battery (sub)modules, reporting battery module state data, controlling a battery system environment, authenticating battery modules and/or balancing them. The BSM is further configured to perform communication with the BMMs of individual battery (sub)modules for performing at least some of the aforementioned tasks and may further be configured to perform communication with at least one external control circuit, e.g., of a load. A BSM according to some example embodiments of the present disclosure may comprise suitable sensors, a controller, and a memory. A BSM according to some example embodiments of the present disclosure further comprises an OCS communication module.

A BMM is responsible for monitoring a state of the at least one battery cell of a single battery module. The monitoring of a state may be affected by, for example, measuring and recording battery cell's voltage and/or temperature or the like by means of specific sensors. A BMM may monitor the state of the battery as represented by different parameters, such as: voltage: total voltage, voltages of individual cells, minimum and maximum cell voltage; temperature: average temperature, coolant intake temperature, coolant output temperature, or temperatures of individual cells; state of charge (SOC) or depth of discharge (DOD), to indicate the charge level of the battery; state of health (SOH), a variously-defined measurement of the remaining capacity of the battery as % of the original capacity; state of power (SOP), the amount of power available for a defined time interval given the current power usage, temperature and other conditions; state of Safety (SOS); coolant flow: for air or fluid cooled batteries; current: current in or out of the battery. A BMM may also comprise suitable sensors, a controller, and a memory. The BMM of the present disclosure also comprises an OCS communication module.

The OCS allows for a bi-directional communication between the BSM and the BMMs using selected wavelengths or ranges of wavelengths of light. In other words, such selected wavelengths or ranges of wavelengths of light may be considered as distinct communication paths or communication channels. Also, each receiving or transmitting direction may be considered as a separate communication path or channel. The light used for such communication may be selected from a spectrum of light that is visible or non-visible to a naked human eye, for example, ultraviolet radiation or infrared radiation. In the battery system according to some example embodiments of the present disclosure, each of the BSM and the BMMs will have a corresponding OCS optical transmitter and receiver so that a bi-directional communication is made feasible between the BSM and each of the respective BMMs. Each such transmitter and receiver may have its own transmission and reception frequency, its own transmission and reception time window (frame) and/or its own transmission and reception angular coverage. Therein, for example, a transmitter transmits its optical signal with an alpha angular coverage (such angular coverage may differ in different axes and horizontal and vertical coverage may be different).

In a broadest sense, a first communication path may be established between the BSM and the BMMs, while a second communication path is established between the BMMs and the BSM. In such cases there may be a mechanism allowing to distinguish between the respective BMMs associated with individual battery modules. Such mechanism may be called an addressing mechanism. In cases when the OCS communication may be affected simultaneously (or concurrently) or nearly simultaneously, i.e. the BMMs cannot transmit over the same wavelength because the communications received by the BSM would be overlapped and possibly would become unreadable, an optional differentiating mechanism is beneficial. In particular this concerns BMMs that are initially unknown to the BSM.

A first addressing mechanism might by FDD/FDM, i.e., that each of the BMMs is assigned an individual transmitting and/or receiving frequency. In such embodiments, the BMMs comprise a transmitter that is configured to transmit at the respective transmitting frequency and a receiver that is configured to receive at the respective receiving frequency. The BSM comprise a transmitter that is configured to transmit at all receiving frequencies of the connected BMMs and a receiver that is configured to receive at all transmitting frequencies of the connected BMMs. The BSM may also comprise transmission/reception filters for filtering specific frequency components from simultaneously (or concurrently) received signals and/or comprises a modulator for transmitting multiple frequency signals in a common transmission. The transmission/reception frequencies may be well separated in order to avoid crosstalk and/or interference between different frequencies. Further, according to some example embodiments, a BSM is configured to operate at a multitude of transmission/reception frequencies which exceed the number of BMMS usually present in a battery system. According to some example embodiments, the individual transmission/reception frequencies may be assigned to the individual BMMs by individual circuits that may further be utilized for addressing as further explained in detail below.

According to some example embodiments, in order to avoid simultaneous (or concurrent) communication from the BMMs to the BSM, a system employing time division multiplexing may optionally be employed. Such time division multiplexing, TDM, may be selectively employed, for example during a setup phase. Options of such selective TDM will be explained in more detail in the remainder of the specification as examples, without limiting the disclosure to TDM. The Time Division Multiplexing, TDM, may be controlled by the BSM, for example, based on a control signal, which may be an optical control signal. According to some example embodiments, the BMMs may be pre-configured with non-overlapping TDM transmission slots.

Configuring of TDM by an optical signal may be such that the BSM transmits a setup signal (for example, a signal of a given pattern such as PWM) and based on the BMM internal setup parameters the BMMs derive their intended time window of the TDM to communicate with the BSM. In other words, the BSM transmits a common setup signal that is processed differently in each BMM for generating different transmission/reception time slots per BMM. The internal setup may be realized by hardware, e.g., a (printed) resistor network or by software. In other words, the internal setup may be realized by a discrete circuit individually assigned to a BMM, as will be explained in detail below.

Four main types of OCS arrangements with respect to transmitters and receivers may include:
  The BSM having a first, common transmission wavelength for outgoing communication to the BMMs while all the BMMs have a second transmission wavelength assigned for their outgoing communication with the BSM;
  The BSM having distinct transmission wavelengths per each BMM while all the BMMs have a common transmission wavelength; therefore the BSM has a common reception wavelength while the BMMs have distinct reception wavelengths per each BMM; correspondingly the BSM may distinctly contact the BMMs and for example instruct how/when they are expected to respond using the BMMs common transmission channel;
  The BSM having a distinct reception wavelengths per each BMM while all the BMMs have a common reception wavelength; therefore the BSM has a single, common transmission wavelength and the BMMs have distinct transmission wavelengths per each BMM; correspondingly each BMM may distinctly contact the BSM and for example instruct how/when the BMMs are to be contacted using the BSMs common transmission channel/wavelength;
  The BSM having distinct transmission wavelengths and distinct reception wavelengths per each BMM; therefore the BSM may distinctly contact the BMMs and each BMM may distinctly contact the BSM.

According to some example embodiments, the BSM may comprise multiple transceivers for distinctly communicating with the BMMs, wherein each BMM may comprise only a single transceiver. The BSM may also comprise multiple receivers and a single transmitter or multiple transmitters and a single receiver. Further, each of the receivers and transmitters may be configured to selectively operate at different transmission/reception frequencies. According to some example embodiments, the OCS is a free-space optical communication FSO system, which contrasts with using solids such as optical fiber.

According to some example embodiments, the differentiation of communication paths is such that the OCS is adapted to use a first wavelength for the communication path in a first direction and a second wavelength, different from the first wavelength, for the communication path in a second direction. Similarly, different ranges of wavelengths and/or a plurality of different wavelengths may be applied. A first direction may be from the BSM to the BMMs while the second direction may be from the BMMs to the BSM (a reversed naming is also applicable).

According to some example embodiments, the differentiation of communication paths is such that the OCS is configured to facilitate the individual connection of the BMMs to and/or from the BSM by a use of different wavelengths for a communication of the BSM with different BMMs. Similarly different ranges of wavelengths and/or a plurality of different wavelengths may be applied. To this end having different wavelengths for different BMMs facilitates addressing at the same time. In particular, each of the different wavelengths or ranges of wavelengths is associated with a different BMM; thereby when for example receiving data over wavelength A, the BSM is aware that a particular BMM and a respective battery module is concerned.

The respective optical transmitters may be limited to certain wavelength or ranges of wavelengths in order not to interfere with another wavelength or other ranges of wavelengths. Such limitation may be variable based on wavelength filtering or use of different colour of a spectrum emitted for example by an integrated colour light emitter (in case of visible light). Similarly in case of infrared, there may be distinguished near-infrared (0.75-1.4 µm), short-wavelength infrared (1.4-3 µm), mid-wavelength infrared (3-8 µm), long-wavelength infrared (8-15 µm), far infrared (15-1000 µm). Alternatively, CIE division scheme (The International Commission on Illumination (CIE)) applies a division of infrared radiation into the following three bands: IR-A (700 nm-1400 nm), IR-B (1400 nm-3000 nm) and IR-C (3000 nm-1 mm). Such divisions are example only as other are possible such as the ISO 20473 division. Further, the respective optical sensors may be sensitive to different optical signal wavelengths or ranges of wavelengths wherein such limitation may be fixed or be variable based on wavelength filtering.

According to some example embodiments, in order to facilitate the individual connection of the BMMs to the BSM, each of the BMMs comprises or is connected to a discrete circuit that is configured to provide an output based on which an individual identifier of a BMM is derived. Such circuits may be added after a common manufacturing process even at a wholesale or retail point. Thus, a common manufacturing process may be applied for all BMMs at a manufacturing plant. According to some example embodiments, the discrete circuit comprises at least one discrete element which may be one or more of resistors, diodes, capacitors, transistors and/or inductors or any other suitable active or passive electronic devices. In a particular example the discrete circuit is an array of resistors, the array having a resistance set at a specific value.

Owing to a use of such an individual identifier, BMMs addressing may be implemented, which is useful for example in cases when a common BSM outgoing (i.e. BSM to BMMs) communication wavelength is used. The BMM may identify itself to the BSM with the individual identifier (facilitating BMM addressing). The BSM may be programmed with the individual identifiers of the BMMs or the individual identifiers of the BMMs may be communicated to the BSM over the OCS. Other example is a common BSM outgoing communication channel whereas for each outgoing communication the BSM may identify, with the individual identifier, the BMM to which the communication is addressed. According to some example embodiments, the BSM may comprise a discrete circuit configured for generating said individual identifiers, whereas each of the BMMs may comprise a discrete circuit configured for determining an identifier in a received signal and comparing to a stored identifier or for determining a predetermined identifier in a received signal. A module for generating said individual identifiers may also be a software module or a combination of software and hardware. According to some example embodiments, the individual identifier may also be derived from the received signal, i.e., for determining that the signal is targeting that individual BMM.

While providing to the BSM the individual identifier of a particular BMM, a Time Division Multiplexing TDM technique or similar may be. It is an optional differentiating mechanism as mentioned above. There may be embodiments where the BSM is not aware of individual identifiers of the BMMs it is to manage. Further there may be present a common channel over which all BMMs transmit to the BSM. In such case transmission overlapping may occur. By using TDM, such overlapping may be avoided. According to some example embodiments, a TDM scheme may be configured in that the BSM transmits a setup signal (for example, a signal of given pattern such as PWM) and based on the BMM internal setup parameters the BMMs derive their intended time window of the TDM for example in order to communicate their individual identifiers to the BSM. The internal setup parameters may be parameters of the received signal, e.g., such parameters that depend on a relative position of the BSM and the respective BMM. As such parameters of the received signals are different per each BMM, its intended time window will also be different which may be ensured by appropriate differentiating processes. Other internal setup parameters may be parameters of the aforementioned discrete circuit, i.e., may be defined by the properties of the discrete circuit. As described for FDM, in such case the BSM may be configured to transmit/receive in a plurality of time frames that exceed the amount of BMMs usually present in a battery system.

Once the individual identifiers of the BMMs are collected by the BSM in the addressing phase, further transmission from the BMMs may be affected only when requested by the associated BSM using the individual identifiers (i.e. the TDM/FDM is no longer required). For example, the BSM may instruct a given BMM to transmit a report after transmission of the request. It is to be noted that exact time is not needed as the BSM is aware when to approximately expect communication and that communication from other BMMs is not expected. As an alternative to TDM the differentiating mechanism may be based on FDD/FDM for transmitting the individual identifiers. Therein, the individual discrete circuits may define the frequency on which the BMMs send and/or receive And further the BSM may be configured to filter the individual signals from an overlapped transmission.

Some example embodiments may apply common BMMs without any special programming or physical differences, which in turn results in easier manufacturing and manufacturing time reduction as the individual BMMs need not have a special configuration at the factory level. According to some example embodiments, each of the battery modules includes an identical BMM and an individual discrete circuit, and according to some example embodiments, an individual resistive print may be utilized thereon which is configured as a discrete circuit, in order to facilitate the individual connection (addressing) of the BMMs to the BSM. This is useful in cases when a common BMM outgoing wavelength is used, in order for the BMM to identify itself to the BSM. The resistive print facilitates different individual identifiers by having different resistive properties. An example of such a resistive print is a flex print.

According to some example embodiments, in order to facilitate the individual connection of the BMMs to the BSM, each BMM is configured to derive its individual identifier based on a signal strength, received by the respective BMM, which is for example caused by a relative, spatial placement of each of the BMMs within the battery system and to communicate the individual identifier to the associated BSM. The aforementioned signal strength may be a range of signal strength. Other signal properties such as its quality may be used alternatively or in addition to the measured signal strength. The measurements are made by appropriate measuring circuits as common in the art and clear to a skilled person. In order to make the BSM aware, which signal strength corresponds to which BMM, each BMM may identify itself to the BSM by using the signal strength (or data derived therefrom or based thereon) as its individual identifier.

In such cases the signal strength is to be reported by BMMs to the BSM to become an individual identifier of a BMM. It is not relevant what is the ordering of BMMs in space, it is sufficient to know that there are for example five BMMs in the battery system. The BMMs may also be spaced to provide different signal strength per each BMM of a group (e.g. all BMMs serially arranged to the left of an axis of the optical transmitter). Alternatively, BMM receivers may have filters installed to facilitate different light attenuation or amplification levels in case more than one BMM may receive a BSM signal of the same or similar BSM signal strength. This facilitates more flexibility with respect to spatially arranging optical receivers of the BMMs within the present battery system and may be software and/or hardware based. In the case of signal strength being used to facilitate identifying different BMMs, during addressing a TDM/FDM scheme for avoiding overlapping communication.

According to some example embodiments, in order to facilitate the individual connection of the BMMs to the BSM, a directional transmitter and receiver may be applied. Such directional transmitters and receivers typically have a very narrow angle (i.e. specifically aimed at a selected receiver) of a respective optical beam so that such directional beams are not affecting other transmitters/receivers in proximity. To this end, common wavelengths may be used for transmission from the BSM to BMMs while the separation between the BMMs is obtained by beamforming at different angles such as distinct transmission angles for distinct BMMs. In order to achieve that, the transmitter of the BSM may comprise a plurality of light sources emitting the same wavelength or a range of wavelengths but towards different BMM receivers positioned at different angular positions. Alternatively, a single BSM light emitter may be present together with a filtering system allowing the direction of the light to be adjusted thereby making it possible to directionally communicate with different BMMs.

According to some example embodiments, the battery system comprises a battery disconnecting unit BDU, wherein the optical communication system is adapted to connect the BDU with the BSM. According to some example embodiments, the BDU comprises a high voltage measurement system, wherein the high voltage measurement system is adapted to supply the BDU with power from the at least one battery module.

According to some example embodiments, the communication is realized with the BSM as master and the BMMs and/or the BDU as slaves. Use of the master-slave arrangement allows for a use of a master-slave setup, wherein any BMM being a slave is only allowed to respond if asked to by the BSM being the master. For that to work, the BSM must be made aware of the individual identifiers of the BMMs. In general, it is not relevant how the BSM is made aware of the individual identifiers of the BMMs and different approaches may apply while the present invention presents some possible solutions e.g. the selective TDM and/or a FDM scheme.

As will be evident to a person skilled in the art, other modules may be connected to the BSM using the OCS. According to some example embodiments, each of the BMMs and/or the BDU comprises an optical transmitter and an optical receiver. According to some example embodiments, the BSM comprises at least one optical transmitter and at least one optical receiver. According to some example embodiments, the at least one optical transmitter of BMMs, BDU and/or BSM is a light-emitting diode. According to some example embodiments, LEDs emitting in different wavelengths, e.g. IR available from 850-940 nm, are used in the optical transmitters. According to some example embodiments, the optical receiver is a photodiode or phototransistor. According to some example embodiments, the photodetector is chosen so that the region of sensitivity lies around the used wavelength or range of wavelengths. It may be also the case that a single photodetector or optical receiver in general may detect multiple wavelengths simultaneously (or concurrently) and assign such wavelengths to different transmitters that may transmit data simultaneously (or concurrently). Alternatively, separate receivers may cover distinct wavelength or ranges of wavelengths. According to some example embodiments, the different wavelengths of light are generated by: different optical transmitters configured to emit a certain wavelength of light; and/or a use of light filters on light generated by the respective optical transmitters. In other words, the battery system comprises a plurality of different optical transmitters, wherein each optical transmitter is configured to emit a distinct wavelength of light; and/or a plurality of different light filters configured to filter distinct wavelengths of light generated by at least one optical transmitter. The wavelengths may also have a form of a wavelength range while the optical transmitters are LEDs as explained above. According to some example embodiments, the FSO system is adapted to use infrared light.

According to some example embodiments, the plurality of battery modules are connected to the BSM in a daisy-chain arrangement. In such a case the BSM is the first component of the daisy-chain and each BMM comprises a first OCS transmitter-receiver pair configured for communication with a preceding component of the daisy chain and a second OCS transmitter-receiver pair configured for communication with a following component of the daisy chain. The daisy-chain arrangement has a benefit over a non-daisy chain arrangement such that there is improved signal strength, simpler addressing scheme (e.g. inferred/implicit as explained below), higher robustness, and higher safety level, e.g., with a ring approach.

According to some example embodiments, the daisy chain is configured with a ring-like topology and the BSM comprises a first BSM OCS transmitter-receiver pair configured for communication with a first BMM of the daisy chain and a second BSM OCS transmitter-receiver pair configured for communication with the last BMM of the daisy chain thereby forming a communication ring. A circular arrangement for the daisy chain with two transmitters and two receivers on the BSM (the last BMM connects back to the BSM) may relatively improve error detection.

The BSM has the same general setup in this embodiment as in the non-daisy-chain embodiment wherein it is sufficient that it has a single transmitter and a single receiver that may operate on the same or different wavelengths or ranges of wavelengths.

According to some example embodiments that utilize a daisy-chain, similarly as in the previous embodiments, the following component may transmit only when asked while the BSM is a master or a top-level component and each BMM in series creates another slave level of hierarchy. In general in this specification a master component is a top level component or a higher ranking (preceding component) while a slave is a lower ranking or a following component in a given series/chain.

During daisy-chain communication, each component may forward all information to its following component or may forward received information excluding information identified for itself. The identification may be affected implicitly or explicitly by using the individual identifiers of BMMs as explained above. Such individual identifiers may be communicated to the BSM.

The implicit addressing is present when each BMM may determine its position in the daisy-chain by monitoring the data it receives. Each message sent to a preceding component may comprise all data received from the following component. In such a case only the last component may create messages and initiate a message sending back process to the BSM.

For example, if a BMM receives from its following component a message comprising information from two following components, it may derive from this message that it is the third component counting from the end of the daisy chain regardless of its name or identifier. In such a case when a BSM knows that there are five BMM components it may send a BSM originating message comprising information for each component with different content for each component. Such a message will be disseminated throughout the daisy chain. According to some example embodiments, each component following the BSM may remove from the BSM originating message the first command i.e. a command directed to this particular component and forward the rest of the BSM originating message to its following components that will act accordingly.

According to some example embodiments, specific addressing in a daisy-chain may also be present. It is useful when only a given BMM must be programmed with a command from the BSM and the BMMs comprise individual identifiers. Further, specific identifiers lower the traffic in the communication system as only a message for a given component is sent from the BSM while only the given component responds to the BSM using its individual identifier. The specific, explicit addressing may be present in the daisy chain according to some example embodiments. When the BSM knows the individual identifiers of the BMMs the BSM may directly and selectively address any BMM.

Therefore, aspects of some example embodiments of the present disclosure may include a method for obtaining component's individual addresses by the BSM for explicit addressing of components in the daisy chain arrangement. The method is implemented by the battery system, as a high level method, while its sub-steps may be implemented either by a BSM or a BMM. The process starts from transmitting a message requesting identifiers of the BMMs by the BSM. This message may be called ID's Request message and is forwarded by each component to its following one. Next, the last BMM in the chain must be established. To this end each BMM may set a response threshold in which it expects some response to the ID's Request message forwarded by itself. Such a response may be a simple acknowledgement ACK message while a full response will follow subsequently. The ACK message may have a relatively short threshold time set as a preceding component may expect an ACK response from its following component in a relatively short time e.g. 1 s.

When the last BMM (component) is not communicatively linked to the BSM, the last component is the BMM that will not receive an ACK within the given threshold. In case of a ring communication the ACK to the last component will arrive from the BSM (finalizing the communication ring) and thus make the last BMM aware that it is the last in chain. Once the last component identifies itself in this manner. It starts the ID Response message feedback by setting itself as a current component (this may be implicit as the current component is the component currently in possession of and processing the ID Response message) and creating the ID Response message comprising an individual identifier of the current component. Then the current component sends back the ID Response to its preceding component (i.e. the component from which the ID's Request message has been received). Subsequently, the ID Response message is received by the preceding component.

The preceding component may be a BSM or a BMM, which is checked (or otherwise known) by the receiving component itself. In case the component in possession of the ID Response message is a BSM the BSM extracts the IDs of all components (BMMs) from the ID Response message and stores the individual IDs in its memory. From this time onwards, the BSM may individually address the respective BMMs. In case the component in possession of the ID Response message is not a BSM (i.e. it is one of the BMMs) the process proceeds to setting itself as the current component. Subsequently, the BMM i.e. the current component adds its own ID to the received ID Response. Such list of added IDs increases in size as each BMM adds its own ID in a loop until the BSM has received the complete list.

The ID Response message may add all individual identifiers of the BMMs in series as they are sent back, thus letting the BSM know also the order to the BMMs in the daisy chain. This may allow the BSM to determine expected communication timings for example it may need to wait more time for a response from the last BMM than for a response from the first BMM (closest to the BSM).

According to some example embodiments, when a BMM that receives an individually addressed message (with a BMM's individual identifier) is not the target BMM (the identified recipient) is just forwards the message to its following BMM unless it is the last BMM in which case it may signal an error as none of the BMMs responded to the message. In turn when a BMM receives such an individual message is the target BMM (the intended recipient) it will stop forwarding and create a response message comprising its individual identifier, which it will send back to its preceding component with the BSM as the target component. All preceding components in the daisy-chain hierarchy will only forward the response message to their preceding components so that the response message may reach the BSM.

Depending on different positioning of the components/modules in the battery system, different geometric positioning for the OCS daisy-chain communication is possible. For instance, in the middle of the pack on top of the modules or on the side of the modules. Alternatively, on the side of the pack—again, on top and to the side of the modules. For different layouts of the general pack design, any arrangement with direct line of sight from one BMM to the next and from the BSM to the first BMM is possible. If direct line of sight cannot be realized, mirrors can be used. According to some example embodiments, a light barrier is present between the first OCS transmitter-receiver pair and the second OCS transmitter-receiver pair. This has a technical effect of separate communications of distinct Tx/Rx pairs not having an influence each other.

According to another aspect of the present disclosure, a vehicle including a battery module as defined above is provided.

Another aspect of the present disclosure is a method for operating a battery system, the method comprising the steps of: providing a plurality of battery modules including a plurality of battery cells, wherein each battery module comprises a battery module monitor, BMM, for monitoring a state of the battery cells, providing a battery system monitor BSM, and providing an optical communication system, OCS, adapted to connect the BMMs with the BSM over at least two communication paths, wherein the OCS is adapted to use at least two different wavelengths of light in order to enable a differentiation of the communication paths. In a method according to some example embodiments, the OCS may be adapted according to some example embodiments of the battery system described above as the first aspect of the present disclosure. It will be evident to a person skilled in the art that the various embodiments of the invention mentioned in this description can be combined with one another, unless otherwise stated in an individual case.

Further aspects of the present disclosure could be learned from the dependent claims or the following description of the accompanying figures.

FIG. 1 illustrates a schematic high-level overview of the system according to some example embodiments. The system is a battery system, which may be part of a battery pack where for example a plurality of battery modules are present in a common housing.

At least one battery module 111-113 is present including at least one battery cell, wherein each battery module 111-113 comprises a battery module monitor BMM 133 for monitoring a state of the at least one battery cell. The monitoring of a state may be affected by for example measuring and recording battery cell's voltage and/or temperature.

Further, the system comprises a managing module 101 with a battery system monitor BSM 121. A BSM 121 is any electronic system that manages a rechargeable battery (cell or battery pack).

According to some example embodiments, the BSM 121 may be integrated in a module comprising a battery connector such as a High-Voltage Connector 123 and an output connector such as a Vehicle Connector 122. In such cases the vehicle may be an electric or hybrid vehicle.

The battery system of FIG. 1 further comprises an optical communication system, OCS, adapted to individually connect the BMMs 133 with the BSM 121 over at least two communication paths P1, P2.

The OCS comprises an optical transmitter and an optical receiver associated with each of the BMMs 133 and the BSM 121. For example, the BSM 121 comprises an optical transmitter OCS Tx 125 and an optical receiver OCS Rx 124 while each BMM 133 comprises an optical transmitter OCS Tx 141 and an optical receiver OCS Rx 142.

The OCS is adapted to use at least two different wavelengths of light in order to enable a differentiation of the communication paths. Details of the OCS will be presented with reference to the figures that follow.

Figure 2A:
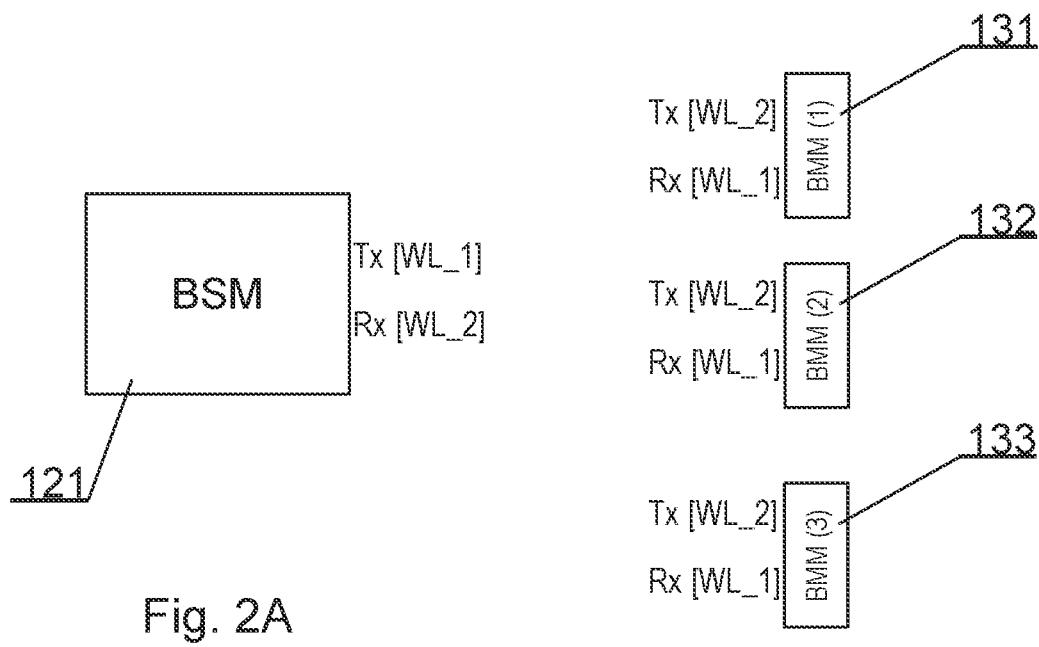
FIGS. 2A to B illustrate an overview of a first communication according to some example embodiments.
Figure 2B:
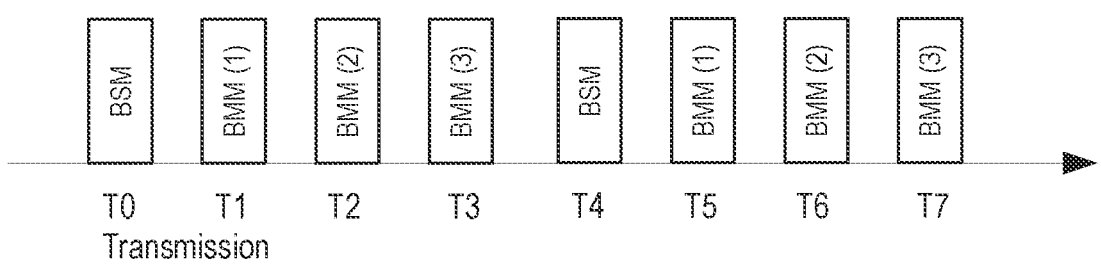

FIGS. 2A to B illustrate a schematic overview of a first communication according to some example embodiments. In this case the BSM 121 comprises a transmitter Tx configured to transmit optical signals, to the respective BMMs, having a predefined wavelength or a range of wavelengths WL_1. The BSM 121 further comprises a receiver Rx configured to receive optical signals from the respective BMMs having a predefined wavelength or a range of wavelengths WL_2. Therefore, the at least two communication paths are created over the aforementioned wavelength or wavelengths ranges WL_1, WL_2.

Correspondingly, each BMM 131-133 comprises a transmitter Tx configured to transmit optical signals having a predefined wavelength or a range of wavelengths WL_2 while each BMM 131-133 comprises a receiver Rx configured to receive optical signals having a predefined wavelength or a range of wavelengths WL_1.

In such a case, the communication may not be affected simultaneously (or concurrently) or nearly simultaneously as the BMMs 131-133 cannot transmit over the WL_2 because the communications received by the BSM 121 would be overlapped and possibly would become unreadable.

A first solution, as already mentioned, is a use of a master-slave setup, wherein any BMM being a slave is only allowed to respond if asked to by the BSM being the master. For that to work, the BSM must be made aware of the individual identifiers of the BMMs.

Another option, as shown in FIG. 2B, a Time Division Multiplexing, TDM, may be employed, which refers to multiplex communication where uplink (BSM as transmitter) is separated from each downlink (one of the BMMs as transmitter, in turn) by the allocation of different time slots in the same frequency band. The TDD technique (duplex as a particular form of multiplex) is used in IEEE 802.16 WiMAX, 3G TD-SCDMA and 4G TDD LTE, among others. The TDM may be configured by having the BMMs 131-133 pre-programmed with non-overlapping transmission slots or by having the BMMs 131-133 pre-configured with means for deriving their non-overlapping transmission slot from a common setup signal.

According to some example embodiments, the configuring of TDM by an optical signal may be such that the BSM 121 transmits a setup signal (for example a signal of given pattern such as PWM) and based on the BMM internal setup parameters the BMMs 131-133 derive their intended time window of the TDM in order to communicate their individual identifiers to the BSM 121. The internal setup parameters may be parameters of the received signal. As the parameters of the received signals are different per each BMM 131-133, its intended time window will also be different which may be ensured by appropriate differentiating processes. Other internal setup parameters may be the parameters of the aforementioned discrete circuit.

As shown in FIG. 2B the BSM 121 transmits at time instants T0 and T4 while the BSM1 transmits at T1 and T5, the BSM2 transmits at T2 and T6, the BSM3 transmits at T3 and T7 time instants. Thereby, the communications do not overlap even though only two communication paths are used i.e. WL_1 and WL_2. According to some example embodiments, where TDD is used for transmission, there need not be employed any special configuration of reception, which may be active all the time.

Figure 3A:
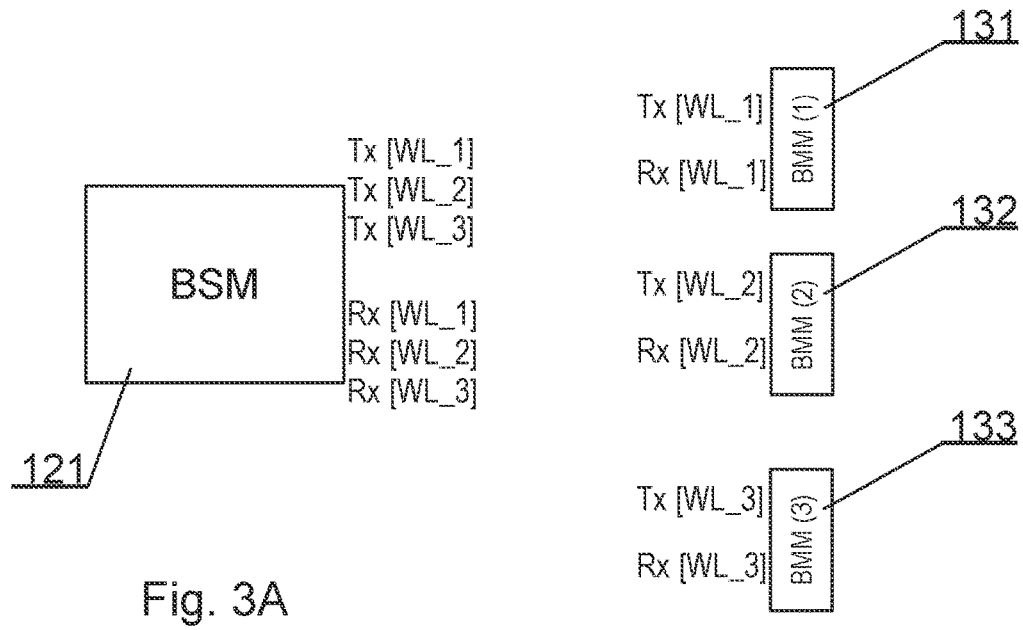
FIGS. 3A to C illustrate an overview of a second communication according to some example embodiments.
Figure 3B:
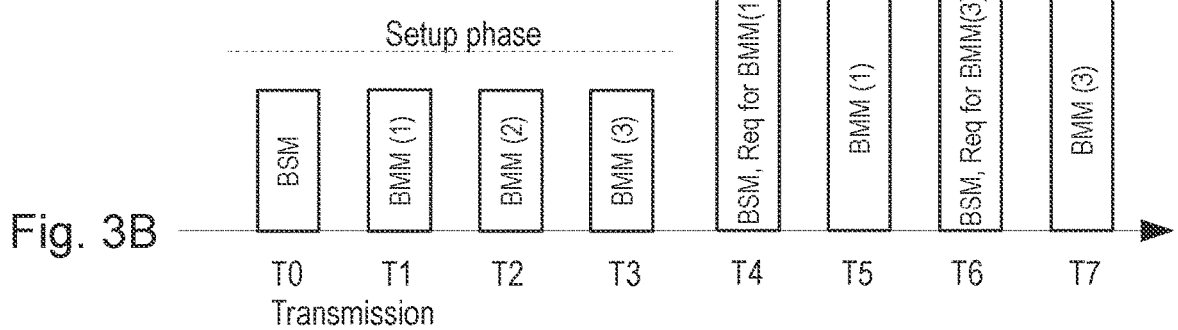
Figure 3C:
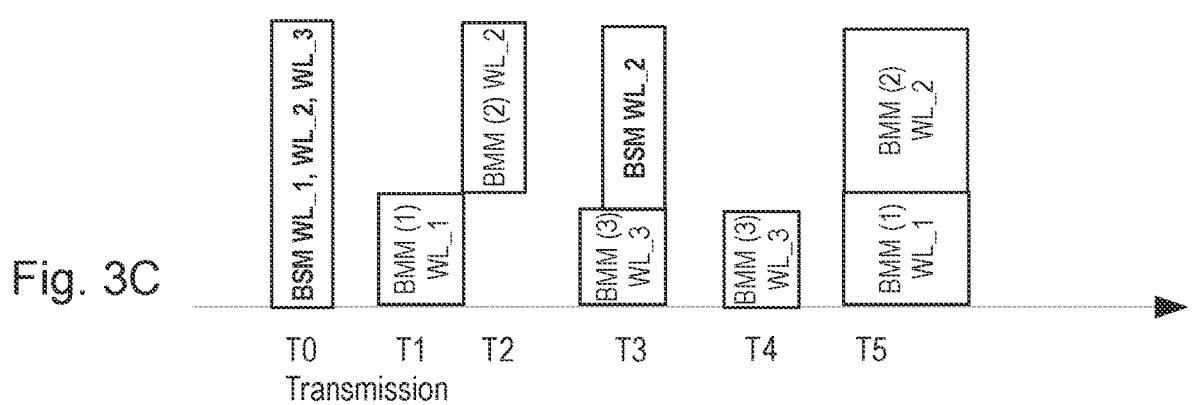

FIGS. 3A to C illustrate a schematic overview of a second communication according to some example embodiments. In this case the BSM 121 comprises a transmitter Tx configured to transmit optical signals having a predefined wavelength or a range of wavelengths per each BMM 131-133 WL_1, WL_2, WL_3. The BSM 121 further comprises a receiver Rx configured to receive optical signals having a predefined wavelength or a range of wavelengths per each BMM 131-133 WL_2, WL_3. Therefore, the at least two communication paths are affected over the aforementioned wavelength or wavelengths ranges WL_2, WL_3. In detail, three communication paths are affected between the BSM 121 and the BMMs 131 to 133.

Correspondingly, each BMM 131-133 comprises a transmitter Tx configured to transmit optical signals having a predefined wavelength or a range of wavelengths i.e. WL_1 for the BMM 131, WL_2 for the BMM 132 and WL_3 for the BMM 133. Further, each BMM 131-133 comprises a receiver Rx configured to receive optical signals having a predefined wavelength or a range of wavelengths i.e. WL_1 for the BMM 131, WL_2 for the BMM 132 and WL_3 for the BMM 133.

In such a case where all communication paths are separate, the TDM is not needed (a full separation may be achieved) as shown in FIG. 3C where communications may overlap in time as for example at time instants T1-T2, T3 or T5. As shown in FIG. 3C the BSM 121 may simultaneously (or concurrently) transmit to BMMs 131-133 using different wavelengths WL_1, WL_2, WL_3. The BSM 121 may also selectively transmit as shown in T3 where it addresses only BSM(2) via WL_2.

However, there is possible a case where either Tx or Rx of the BSM 121 is common (i.e. has one predefined wavelength or a range of wavelengths) for all BMMs 131-133. In such case a TDM may also be applied as per FIG. 3B for example to deliver individual identifiers of the BMMs 131-133 to the BSM 121 at least during the setup phase as explained above. In case of FIG. 3B there is a common Tx of BSM 121 and therefore common Rx of the BMMs. Thus, the BSM 121 sends at T0 a request for all identifiers that are reported back at T1 to T3. From then onwards the BSM 121 may use individual identifiers when requesting data from a specific BMM 131-133 as at T4 and T6.

Figure 4A:
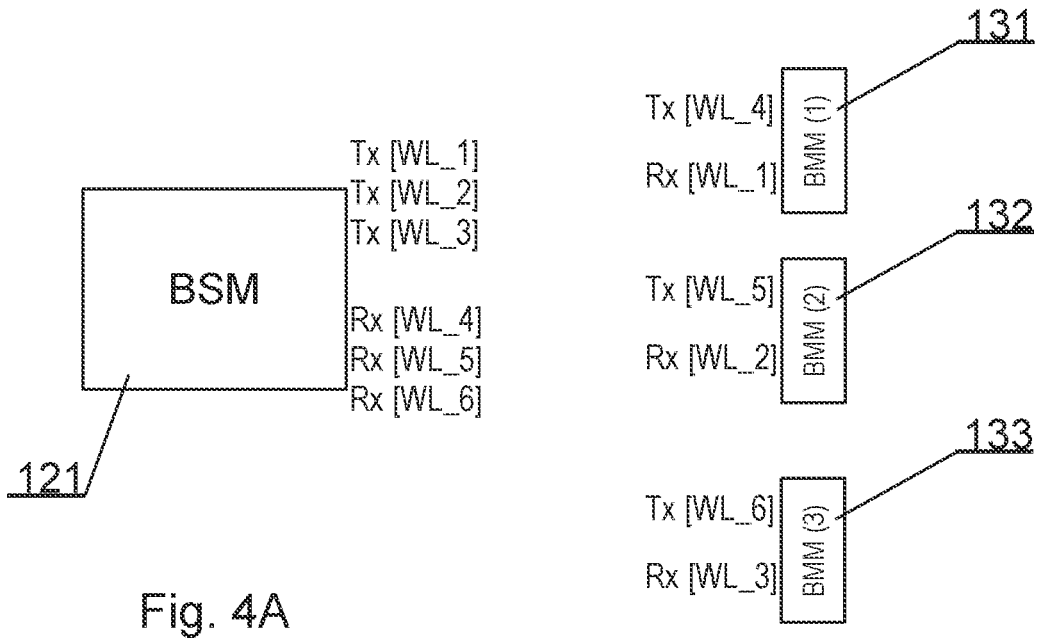
FIGS. 4A to B illustrate an overview of a third communication according to some example embodiments.
Figure 4B:
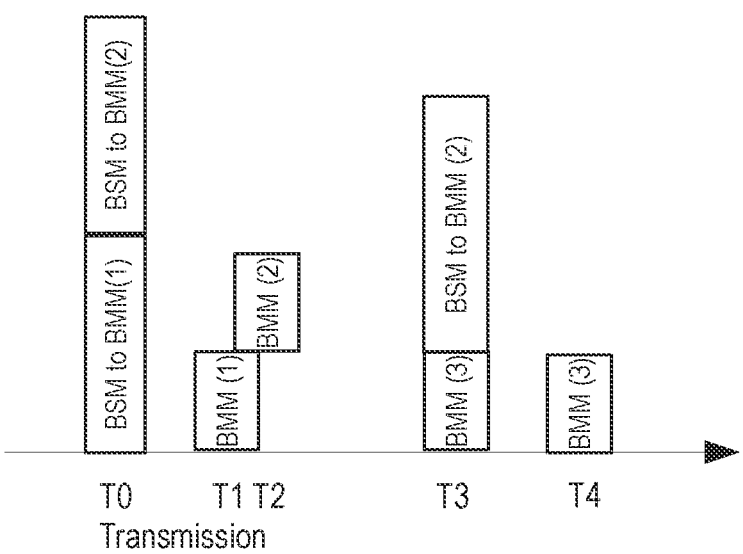

FIGS. 4A to B illustrate an overview of a third communication according to some example embodiments. In this case the BSM 121 comprises a transmitter Tx configured to transmit optical signals having a predefined wavelength or a range of wavelengths per each BMM 131-133 WL_1, WL_2, WL_3. Further, the BSM 121 comprises a receiver Rx configured to receive optical signals having a predefined wavelength or a range of wavelengths per each BMM 131-133 WL_4, WL_5, WL_6. Therefore, the at least two communication paths are affected over the aforementioned wavelength or wavelengths ranges WL_1-WL_6. In detail, six communication paths are affected between the BSM 121 and the BMMs 131 to 133.

Correspondingly, each BMM 131-133 comprises a transmitter Tx configured to transmit optical signals having a predefined wavelength or a range of wavelengths i.e. WL_4 for the BMM 131, WL_5 for the BMM 132 and WL_6 for the BMM 133. Further, each BMM 131-133 comprises a receiver Rx configured to receive optical signals having a predefined wavelength or a range of wavelengths i.e. WL_1 for the BMM 131, WL_2 for the BMM 132 and WL_3 for the BMM 133.

In such a case where all communication paths are separate, i.e., where each communication path uses a distinct wavelength of WL_1-WL_6, the TDM is not needed as shown in FIG. 4B where communications may overlap in time as for example in T1-T2, T3 or T5 time instants. However, they may also be separate as one communication does not influence another.

Figure 5A:
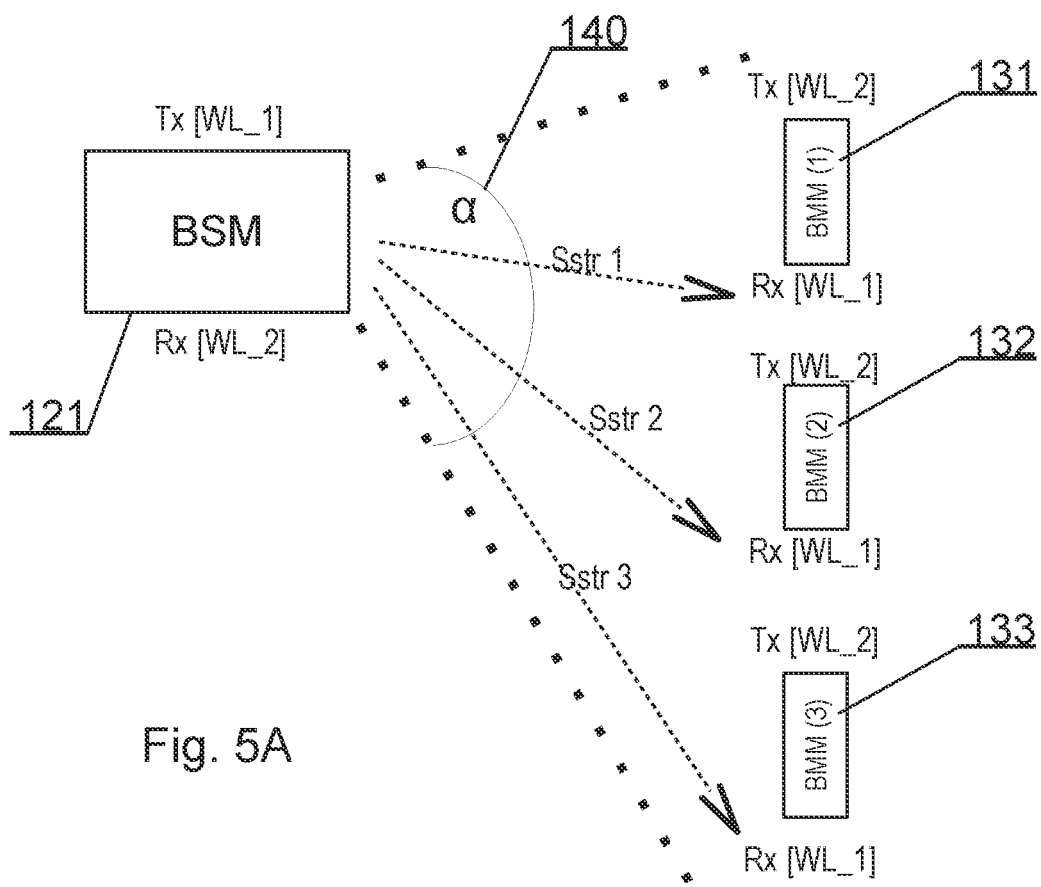
FIGS. 5A to B illustrate an overview of a fourth communication according to some example embodiments.
Figure 5B:
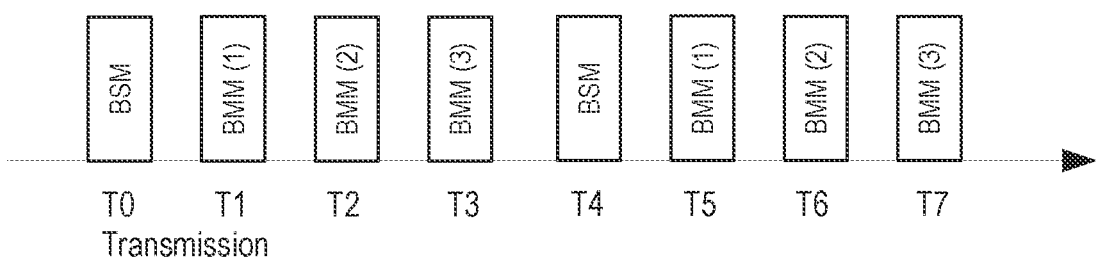

FIGS. 5A to B illustrate an overview of a fourth communication according to some example embodiments. According to some example embodiments, as illustrated in FIGS. 2A to B, the BMMs 131-133 may be configured to measure signal strength of the transmission received from the BSM 121 wherein the transmitter of the BSM 121 transmits its signal with an alpha angular coverage 140 (an angular coverage of the emitter of Tx of the BSM 121). Therefore, the BMM 131 measures signal strength 1, SStr1, the BMM 132 measures signal strength 2, SStr2, and the BMM 133 measures signal strength 3, SStr3.

Owing to that arrangement, each of the at least one battery modules 111-113 comprises an identical BMM 131-133 whereas in order to facilitate the individual connection of the BMMs 131-133 to the BSM 121, each BMM 131-133 is configured to derive its individual identifier based on a signal strength, received by the respective BMM 131-133 and to use this individual identifier in communication with the BSM 121.

The signal strength level may for example be caused by a relative placement of each of the BMMs 131-133 within the battery system. Alternatively, the relative placement of the BMMs 131-133 may be the same or similar in case of more than one BMM so that the same or similar signal strength is reported. However, in this case the BMMs may apply different filters to modify (e.g. attenuate or amplify) the respective signal strength. Such filters may be software and/or hardware.

The BSM 121 associates a given BMM identifier with the data received from the respective BMM 131-133.

In such case the TDM (FIG. 5B) will be applicable as the BMM 131-133 transmitters use a common wavelength of WL_2. However, the BSM 121 may transmit at any time and address a particular BMM 131-133 by using the BMM 131-133 individual identifier determined based on a signal strength. To this end the communication of FIG. 5B may also be organized as shown in FIG. 3B, e.g. the TDM only in the setup phase.

Figure 6:
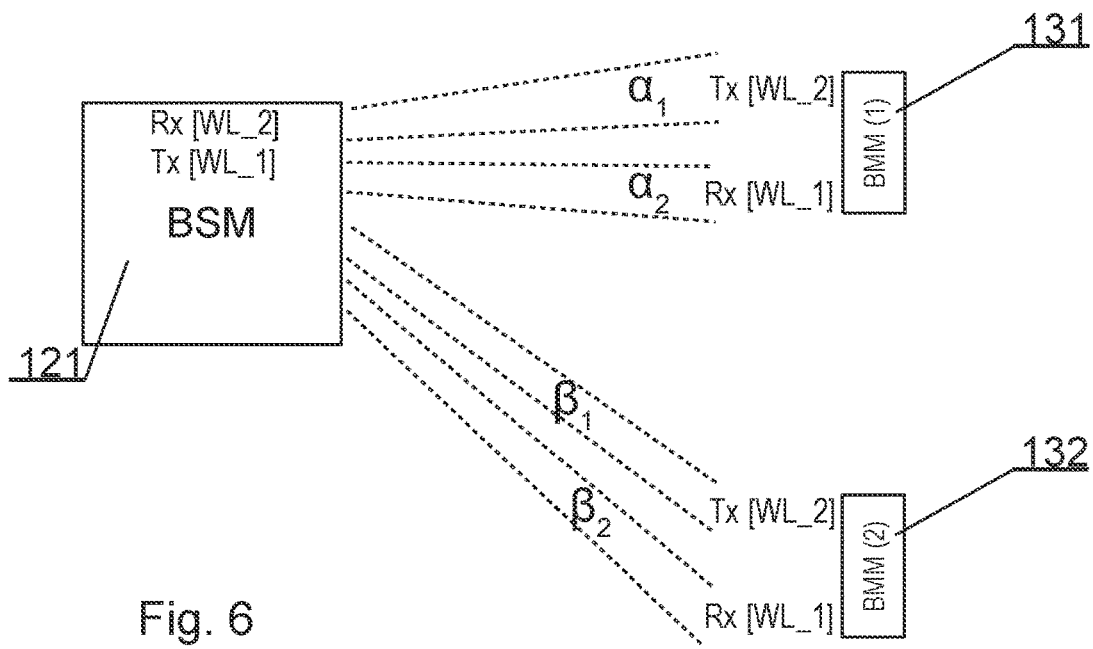
FIG. 6 illustrates an overview of a fifth communication according to some example embodiments.

FIG. 6 illustrates an overview of a fifth communication according to some example embodiments. In this case the embodiment of FIG. 2A is used but the communication links are formed by applying beamforming (or otherwise a directional transmission/reception technique) such that although common wavelengths may be used WL_1, WL_2 the separation between the BMMs 131-132 is obtained by beamforming at different angles $\alpha_1$, $\alpha_2$ and $\beta_1$, $\beta_2$. To this end the transmitter of the BSM 121 may comprise two light sources (more generally, a plurality of light sources matching the number of the BMMs) emitting the same wavelength or a range of wavelengths WL_1 but towards different receivers (i.e. BMM1 131 and BMM2 132 respectively) positioned at different angular positions, i.e., $\alpha_2$ and $\beta_2$. Alternatively, a single BSM 121 light emitter may be present together with a filtering system allowing the direction of the light to be adjusted thereby making it possible to directionally communicate with different BMMs. According to some example embodiments, more than one transmitter having the emitters configured to emit the same wavelength or a range of wavelengths may be utilized because the directional communication will make them distinct based on angles.

In such a case, a simultaneous (or concurrent) transmission is possible while the respective BMMs need not have special individual identifiers as the respective signal angles serve a purpose of individually identifying the BMMs.

Figure 7:
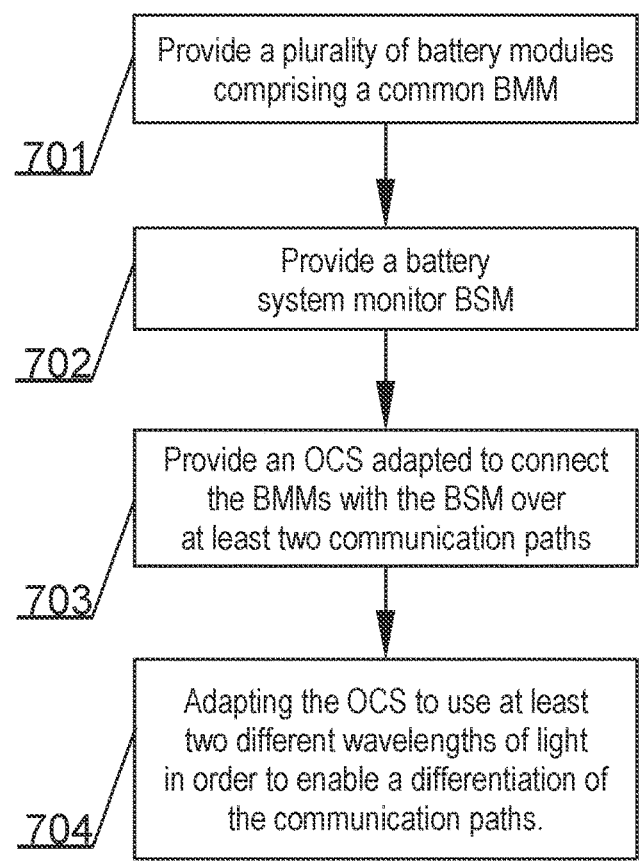
FIG. 7 shows a top level method according to some example embodiments.

FIG. 7 presents a method for operating a battery system. The method starts at step 701 from providing a plurality of battery modules including a plurality of battery cells, wherein the battery module comprises a battery module monitor BMM for monitoring a state of the respective battery cells.

Next the process continues to providing 702 a battery system monitor BSM, and subsequently providing 703 an optical communication system OCS adapted to connect the BMMs with the BSM over at least two communication paths.

The OCS is configured 704 to use at least two different wavelengths of light in order to enable a differentiation of the communication paths.

Figure 8:
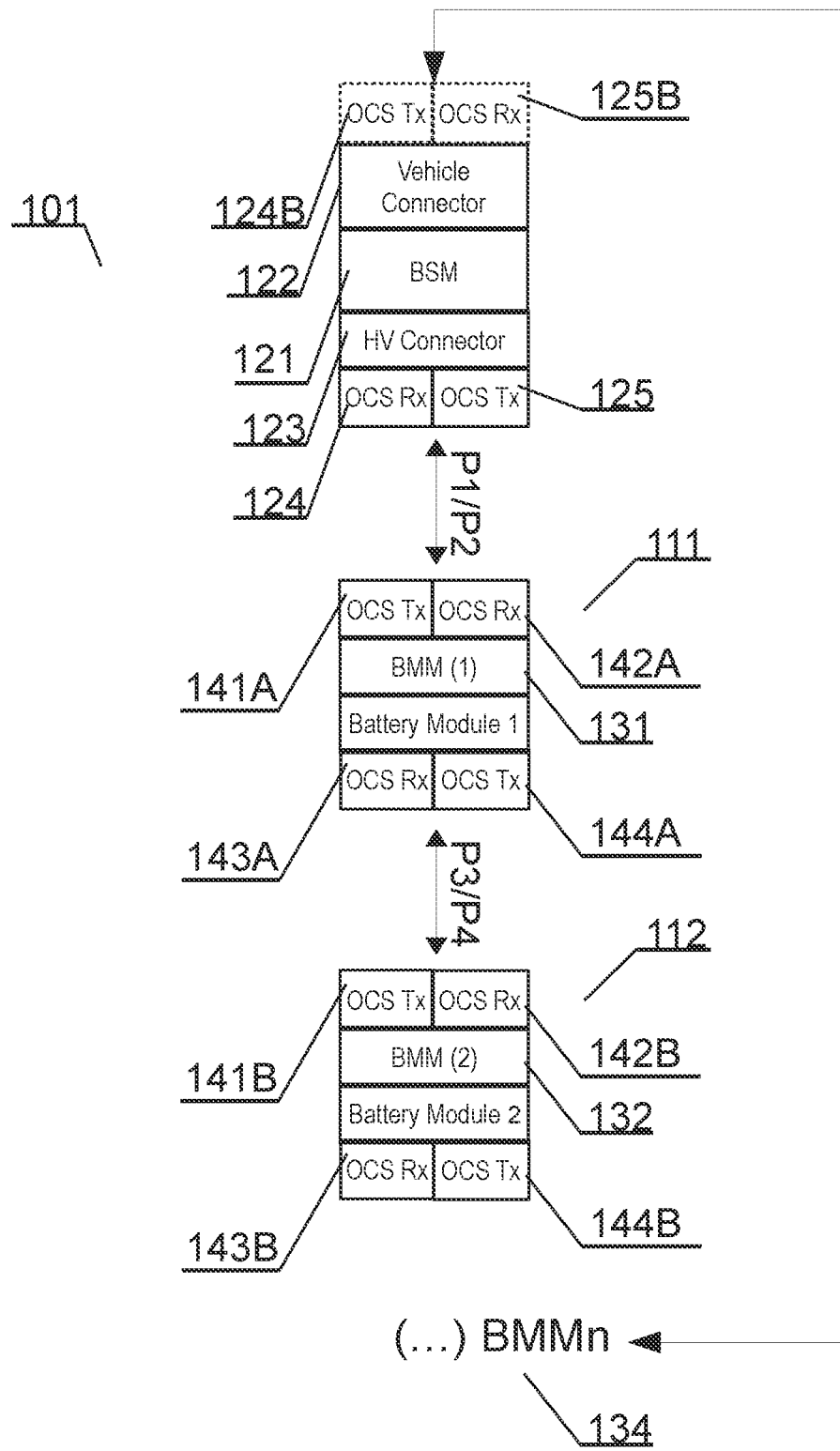
FIG. 8 illustrates a daisy-chain setup according to some example embodiments.

FIG. 8 illustrates further details of an example embodiment of the battery system where a daisy-chain setup is employed. As illustrated in FIG. 8, a daisy chain comprises one BSM 121 as a starting module/component and a plurality of BMMs 131-132 connected in series. The starting component may also be referred to as the first component.

Although FIG. 8 shows two BMMs 131-132 it is clear to a person skilled in the art that more BMMs 131-132 to BMMn (134) may be present in series. A circular arrangement for the daisy chain with two transmitters and two receivers on the BSM 121 (i.e. the last BMM connects back to the BSM 121) is possible. In such a case the BSM 121 shall have an additional pair of Rx/Tx 124B, 125B to communicate with the last BMM in the chain, such as a BMMn 134.

However, a BMM 131-132 is modified in this embodiment to comprise two pairs of Tx/Rx 141A, 142A and 143A, 144A respectively. The first pair of Tx/Rx 141A, 142A communicates with a preceding daisy-chain component which may be a BSM 121 or a BMM 131 while the second pair of Tx/Rx 143A, 144A communicates with a following daisy-chain component which may be a BSM 121 or a BMM 131-132, but typically is a BMM 131-132.

Therefore, for the BMM 131 the preceding component is the BSM 121 while the following component is the BMM 132 in FIG. 8. Each pair of BMM's Tx/Rx may be separated by a light barrier so that separate communications of distinct Tx/Rx pairs do not influence each other. According to FIG. 8 the BSM 121 communicates with a first BMM 131, which further communicates with a second BMM 132.

The second BMM 132 has the same components as the first BMM 131 while its Tx/Rx pairs are 141B, 142B and 143B, 144B respectively. Communication paths P3 and P4 are therefore created between the first BMM 131 and the second BMM 132. Further BMMs 131-134 may be connected in the same manner.

As is evident from FIG. 8 according to some example embodiments the differentiating mechanism aimed at avoiding simultaneous (or concurrent) communication, such as the proposed TDM or FDM, is not needed as there is only present communication between two components e.g. one BMM 131-132 to one BMM 131-132 or the BSM 121 to one BMM 131-132. The communication between a pair of components may not be influenced by communication of another pair of components.

During communication, each component may forward all information to its following component (i.e. down the daisy chain) or may forward received information excluding information identified for itself. The identification may be affected implicitly (as explained below) or explicitly by using the individual identifiers of BMMs as explained above and in reference to FIG. 9. Such individual identifiers may be communicated to the BSM 121.

In a simple form the daisy-chain setup does need to know the identity of the present BMMs 131-132 and may only request data from all BMMs 131-132 without individualizing them. For example, the BSM 121 only requests periodical reports from the BMMs 131-132. In that case the reports may come arranged in series (always the same) and the BSM 121 will be able to monitor specific BMMs 131-132 in time while not being able to address each BMM 131-132 individually.

According to some example embodiments, an inferred/implicit addressing may be present. To this end each BMM 131-132 may determine its position in the daisy-chain by monitoring the data it receives. Each message sent to a preceding component may comprise all data received from the following component. In such a case, only the last component may create messages and initiate a message sending back process to the BSM.

For example, if a BMM 131-132 receives from its following component a message comprising information from two following components, it may derive from this message that it is the third component counting from the end of the daisy chain regardless of its name or identifier. In such a case when a BSM 121 knows that there are five BMM components 131-132 it may send a BSM originating message comprising information for each component with different content for each component e.g. {empty; empty; reset; empty; empty}. Such a message will be disseminated throughout the daisy chain. If such a message is received by the third component it will execute the reset while the other components receiving the message will do nothing as per the 'empty' command.

According to some example embodiments, each component following the BSM 121 may remove from the BSM originating message the first command i.e. a command directed to this particular component. Therefore, in case of five components, component five and component four will remove one 'empty' command each and when the BSM originating message reaches the third component it will comprise only {reset; empty; empty} and the receiving component will act on the 'reset' command, remove it from the BSM originating message and forward the rest of the BSM originating message to its following components that will act accordingly.

Nevertheless, according to some example embodiments, specific addressing in a daisy-chain may also be present. It is useful when only a given BMM 131-132 must be programmed with a command from the BSM 121 and the BMMs comprise individual identifiers.

Figure 9:
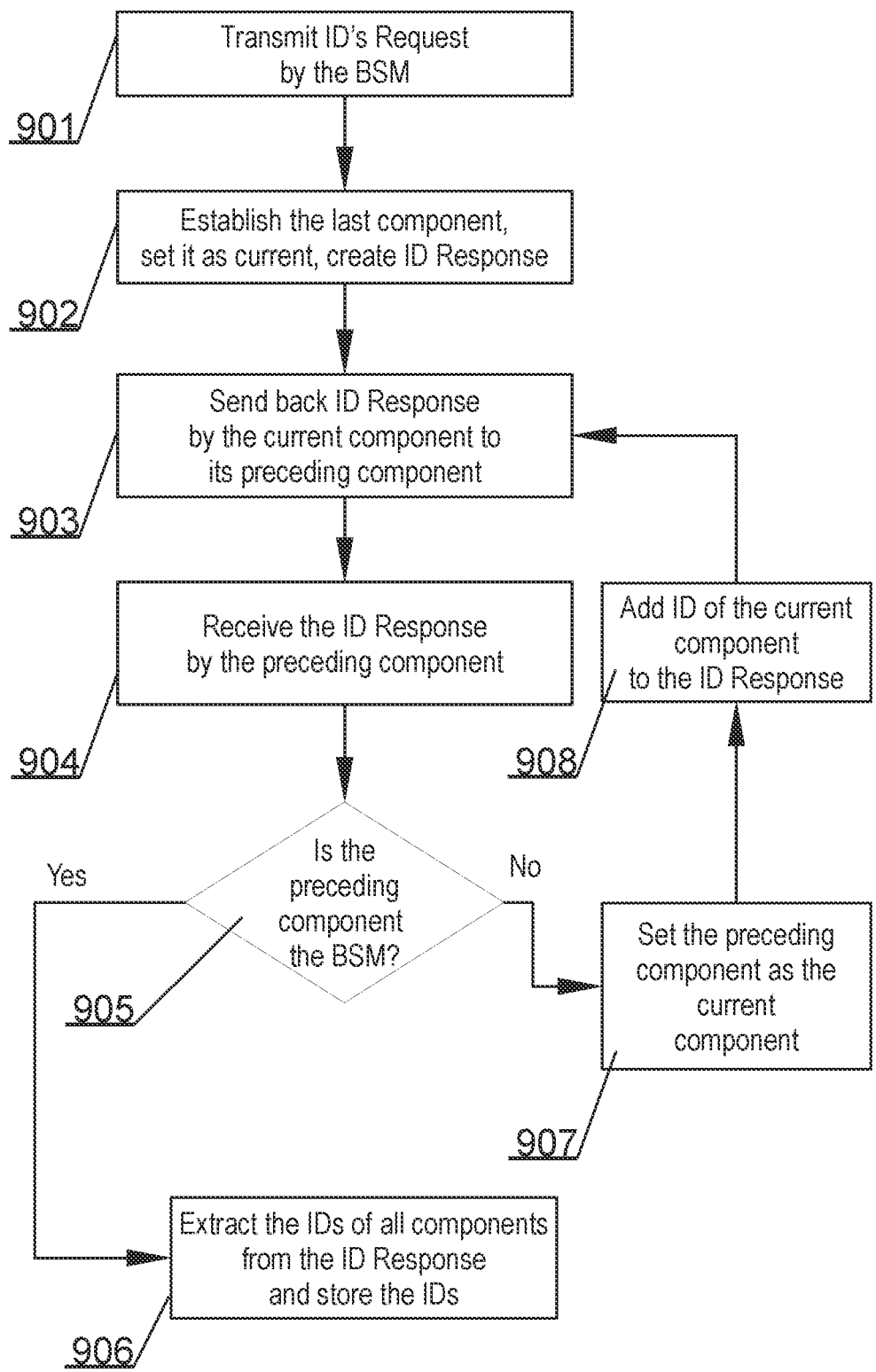
FIG. 9 shows a method for obtaining individual identifiers of BMMs by a BSM in the daisy-chain setup according to some example embodiments.

FIG. 9 shows a method for obtaining individual identifiers of the BMMs 131-132 by the BSM 121 in the aforementioned daisy-chain arrangement. In this case the addresses/identifiers may be given explicitly.

When the BSM 121 knows the individual identifiers of the BMMs 131-132 the BSM 121 may directly and selectively address any BMM 131-132.

The method of FIG. 9 is a high level method while its sub-steps may be implemented either by a BSM 121 or a BMM 131-133 as will be explained.

The process starts at step 901 from transmitting a message requesting identifiers of the BMMs 131-133 by the BSM 121. This message may be called ID's Request message and is forwarded by each component to its following one.

Next, at step 902, the last BMM in chain must be established. To this end each BMM may set a response threshold in which it expects some response to the ID's Request message forwarded by itself. Such a response may be a simple acknowledgement ACK message while a full response will follow subsequently. The ACK message may have a relatively short threshold time set as a preceding component may expect an ACK response from its following component in a relatively short time e.g. 1 s.

In a simple version according to some example embodiments, then the last BMM (component) is not communicatively linked to the BSM 121, the last component is the BMM that will not receive an ACK within the given threshold.

It will be understood by one skilled in the art that in case of a ring communication the ACK to the last component will arrive from the BSM 121 and thus make the last BMM aware that it is the last in chain.

Once the last component identifies itself in this manner. It starts the ID Response message feedback by setting itself as a current component (this may be implicit as the current component is the component currently in possession of and processing the ID Response message) and creating the ID Response message comprising an individual identifier of the current component. Then at step 903 the current component sends back the ID Response to its preceding component (i.e. the component from which the ID's Request message has been received).

At step 904 the ID Response is received by the preceding component. The preceding component may be a BSM 121 or a BMM 131-132, which is checked (or otherwise known) by a component itself.

In case 905 the component of step 904 is a BSM 121 the process proceeds to step 906 where the BSM 121 extracts the IDs of all components (BMMs) from the ID Response and stores the IDs in its memory. From then onwards, the BSM 121 may individually address the respective BMMs.

In case 905 the component of step 904 is not a BSM 121 (i.e. it is one of the BMMs 131-132) the process proceeds to step 907 where the preceding component is set as the current component.

Subsequently, at step 908 the BMM 131-132 (i.e. the current component) adds its own ID to the received ID Response. Such list of added IDs increases in size as each BMM 131-132 adds its own ID in a loop until the BSM 121 has received the complete list.

For example, when the daisy chain comprises a BSM1, BMM1, BMM2 and BMM3. The BMM3 is the last component (step 902) and the ID Response message it creates comprises only BMM3 (its ID). After a first iteration of the loop of FIG. 9, the ID response message comprises BMM2+BMM3 while after a second iteration of the loop the ID Response message comprises BMM1+BMM2+BMM3. Lastly at step 905, the ID Response message reaches the top-level BSM 121.

The ID Response message may add all individual identifiers of the BMMs 131-132 in series as they are sent back, thus letting the BSM 121 know also the order to the BMMs 131-133 in the daisy chain.

Once the identifiers have been collected by the BSM 121, the BSM 121 may create and send messages directly to selected BMM by using its identifier. When a BMM 131-132 that receives such individual message is not the target BMM (the identified recipient) is just forwards the message to its following BMM unless it is the last BMM in which case it may signal an error as none of the BMMs responded to the message. In turn when a BMM 131-132 receives such an individual message is the target BMM (the intended recipient) it will stop forwarding and create a response message comprising its individual identifier, which it will send back to its preceding component with the BSM 121 as the target component. All preceding components in the daisy-chain hierarchy will only forward the response message to their preceding components so that the response message may reach the BSM 121.

According to the method, the OCS may be adapted according to some example embodiments of the battery system described above as the first aspect of the present disclosure.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the example embodiments of the present invention.

It will be apparent to those skilled in the art that various modifications and deviations can be made in the inventive concept. Thus, it is intended that the present disclosure covers the modifications and deviations of this invention provided they come within the scope of the appended claims and their equivalents. Hence, the real protective scope of the inventive concept shall be determined by the technical scope of the accompanying claims and their equivalents.

DESCRIPTION OF SOME OF THE REFERENCE SYMBOLS

101 Managing module
111 to 113 Battery modules
121 Battery system monitor, BSM
123 High-Voltage Connector
122 Vehicle Connector
125, 141 Optical transmitter, OCS Tx
141A, 141B
144A, 144B
124, 142 Optical receiver, OCS Rx
142A, 142B
143A, 143B
131 to 133 Battery module monitor, BMM
140 Angular coverage
WL_1 to WL_6 Wavelength or a range of wavelengths
SStr1 to SStr3 Signal strength readings
$\alpha_1, \alpha_2, \beta_1, \beta_2$ Beamforming angles
T0 to T7 Time instants
P1, P2, P3, P4 Communication paths
701-704, 901-908 Method steps

What is claimed is:
1. A battery system comprising:
a plurality of battery modules including a plurality of battery cells, wherein each battery module of the plurality of battery modules comprises a battery module monitor configured to monitor a state of the plurality of the battery cells;
a battery system monitor; and
an optical communication system configured to connect each battery module monitor with the battery system monitor over at least two communication paths,
wherein the optical communication system is configured to use at least two different wavelengths of light to differentiate between the at least two communication paths to connect each battery module monitor with the battery system monitor.

2. The battery system of claim 1, wherein the optical communication system is a free-space optical communication system.

3. The battery system of claim 2, wherein the plurality of battery modules are connected to the battery system monitor in a daisy-chain;
wherein the battery system monitor is a first component of the daisy-chain;
wherein each battery module monitor comprises:
    a first optical communication system transmitter-receiver pair configured to communicate with a preceding component of the daisy-chain; and
    a second optical communication system transmitter-receiver pair configured to communicate with a following component of the daisy-chain.

4. The battery system of claim 3, further comprising a light barrier between the first optical communication system transmitter-receiver pair and the second optical communication system transmitter-receiver pair.

5. The battery system of claim 3, wherein the battery system monitor comprises:
    a first battery system monitor optical communication system transmitter-receiver pair configured to communicate with a first battery module monitor of the daisy-chain; and
    a second battery system monitor optical communication system transmitter-receiver pair configured to communicate with a last battery module monitor of the daisy-chain thereby forming a communication ring.

6. The battery system of claim 1, wherein the optical communication system is configured to use a first wavelength for a communication path in a first direction and a second wavelength, different from the first wavelength, for a communication path in a second direction.

7. The battery system of claim 1, wherein the optical communication system is configured to use different wavelengths for communication between the battery system monitor and different ones of the battery module monitors.

8. The battery system of claim 1, wherein each of the battery module monitors comprises a discrete circuit configured to provide an output based on which a battery module monitor individual identifier is derived.

9. The battery system of claim 8, wherein each of the battery modules comprises an identical battery module monitor with an individual resistive print thereon as the discrete circuit.

10. The battery system of claim 1, wherein each battery module monitor is configured to derive an individual identifier based on a signal strength received by the respective battery module monitor and to use the individual identifier for communication with the battery system monitor.

11. The battery system of claim 1, wherein each of the battery module monitors comprises an optical transmitter and an optical receiver.

12. The battery system of claim 11, wherein at least one optical transmitter is a light-emitting diode.

13. The battery system of claim 11, wherein at least one optical receiver is a photodiode or phototransistor.

14. The battery system of claim 11, further comprising:
    a plurality of optical transmitters, wherein each optical transmitter is configured to emit a distinct wavelength of light; and
    a plurality of light filters configured to filter distinct wavelengths of light generated by at least one optical transmitter.

15. The battery system of claim 1, wherein the battery system monitor comprises at least one optical transmitter and at least one optical receiver.

* * * * *